United States Patent
Boddeda et al.

(10) Patent No.: US 12,018,606 B1
(45) Date of Patent: Jun. 25, 2024

(54) INTEGRATED GROMMET FILTER

(71) Applicant: Caterpillar Inc., Peoria, IL (US)

(72) Inventors: Prathap J. Boddeda, Dunlap, IL (US); Stephen Ellis Oedewaldt, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/103,958

(22) Filed: Jan. 31, 2023

(51) Int. Cl.
*F01N 3/20* (2006.01)
*B01D 24/00* (2006.01)
*B01D 24/04* (2006.01)
*B01D 24/14* (2006.01)
*B01D 24/20* (2006.01)
*B01D 29/13* (2006.01)
(Continued)

(52) U.S. Cl.
CPC ........... *F01N 3/2066* (2013.01); *B01D 29/13* (2013.01); *F16J 15/104* (2013.01); *B01D 24/004* (2013.01); *B01D 24/042* (2013.01); *B01D 24/14* (2013.01); *B01D 24/20* (2013.01); *B01D 35/027* (2013.01); *B01D 35/28* (2013.01); *B01D 2201/347* (2013.01); *F01N 2610/02* (2013.01); *F01N 2610/10* (2013.01); *F01N 2610/14* (2013.01); *F01N 2610/1406* (2013.01); *F01N 2610/1413* (2013.01); *F01N 2610/142* (2013.01); *F01N 2610/1426* (2013.01); *F01N 2610/144* (2013.01); *F01N 2610/1453* (2013.01); *F01N 2610/1466* (2013.01); *F01N 2610/1473* (2013.01); *F01N 2900/18* (2013.01); *F01N 2900/1806* (2013.01); *F01N 2900/1814* (2013.01)

(58) Field of Classification Search
CPC combination set(s) only.
See application file for complete search history.

(56) References Cited

U.S. PATENT DOCUMENTS 9,468,875 B2 * 10/2016 Cassidy ................. B01D 29/27
10,201,771 B2    2/2019 Malgorn et al.
(Continued)

FOREIGN PATENT DOCUMENTS

DE        102014211500 A1    12/2015
GB              2587080       3/2021
(Continued)

OTHER PUBLICATIONS

Written Opinion and International Search Report for Int'l. Patent Appln. No. PCT/US2023/084212, mailed Mar. 22, 2024 (14 pgs).

*Primary Examiner* — Binh Q Tran
(74) *Attorney, Agent, or Firm* — Brannon Sowers & Cracraft PC

(57) ABSTRACT

A diesel engine aftertreatment system is disclosed. The aftertreatment system includes a diesel exhaust fluid (DEF) injection system including a selective catalytic reduction (SCR) device, a DEF tank connected to the SCR device, a DEF injection device installed in the tank, and an integrated grommet filter. The integrated grommet filter includes a grommet having a top gasket portion and a bottom cylindrical skirt portion. The cylindrical skirt portion is integrally connected to a sock filter. In an embodiment, the integral connection between the skirt portion and the sock filter includes an overlap and stitching. In an embodiment, the gasket is a star shaped gasket.

19 Claims, 5 Drawing Sheets

(51) Int. Cl.
*B01D 35/027* (2006.01)
*B01D 35/28* (2006.01)
*F16J 15/10* (2006.01)

(56) References Cited

U.S. PATENT DOCUMENTS

| | | | |
|---|---|---|---|
| 11,268,419 B2* | 3/2022 | Balea | F01N 3/2066 |
| 11,331,605 B2* | 5/2022 | Azuma | E02F 9/00 |
| 11,384,669 B2* | 7/2022 | Swaroop | B01D 35/30 |
| 2015/0198071 A1* | 7/2015 | Hudgens | F01N 3/2066 |
| | | | 210/295 |
| 2016/0290520 A1* | 10/2016 | Memmer | B60K 15/03519 |
| 2017/0122170 A1* | 5/2017 | Fahrenkrug | B01D 35/0276 |
| 2021/0010406 A1 | 1/2021 | Swaroop et al. | |
| 2021/0047956 A1 | 2/2021 | Balea | |

FOREIGN PATENT DOCUMENTS

| | | |
|---|---|---|
| JP | 3803023 B2 | 8/2006 |
| JP | 2015055189 A | 3/2015 |
| WO | 2015117117 A1 | 8/2015 |
| WO | 2017120040 A1 | 7/2017 |

* cited by examiner

INTEGRATED GROMMET FILTER

TECHNICAL FIELD

The embodiments described herein are generally directed to a diesel engine exhaust aftertreatment system and, more particularly, to a filtering system provided in a diesel exhaust fluid (DEF) injection assembly.

BACKGROUND OF THE INVENTION

Diesel engines require the injection of a diesel exhaust fluid (DEF) (e.g., liquid ammonia) into an engine aftertreatment device in order to accelerate a catalytic conversion at high temperatures. In order to avoid engine aftertreatment damage, the DEF pumped out of a DEF tank/reservoir needs to first be cleaned (e.g., by a filter in the tank) of contaminants. In some current DEF injectors, unused clean DEF is returned to the unfiltered/dirty part of the tank, a filter is installed in the DEF tank via a mechanical clamp, and a gasket is separately installed at an opening of the DEF tank.

U.S. Pat. No. 10,201,771 describes a filtration system including a gasket having an integral drain. The filtration system includes a filter housing having a central tube and a replaceable filter element. The central tube includes a gasket that plugs a passage from the dirty side of the filter element to the clean side of the filter element. The gasket includes an integrated drain passage extending through the gasket. The gasket stays in place when the filter element is removed (e.g., by an operator during a service on or replacement of the filter element).

The present disclosure is directed toward overcoming one or more of the problems discovered by the inventors.

SUMMARY OF THE INVENTION

In an embodiment, a diesel exhaust fluid (DEF) injection and filtration assembly for use in a DEF tank of an engine aftertreatment system is disclosed, the DEF injection and filtration assembly comprising: a DEF injection device with a flange, the flange having a lip portion extending therefrom; and an integrated grommet filter comprising a grommet integrally connected to a sock filter, the grommet having a gasket portion and a skirt portion.

In an embodiment, a fluid injection and filter assembly for use in a diesel exhaust fluid (DEF) tank is disclosed, the fluid injection and filter assembly comprising: a skirt-style grommet including an annular gasket portion and a cylindrical skirt portion; a sock filter integrally connected to the cylindrical skirt portion; and a circular flange including a top portion and a lip portion protruding from an outer circumference of the top portion.

In an embodiment, an integrated grommet filter for use in a diesel exhaust fluid (DEF) tank of an engine aftertreatment system is disclosed, the integrated grommet filter comprising: a sock filter; a non-permeable flexible grommet having (i) a cylindrical skirt having a bottom portion overlapping and integrally connected to the sock filter and (ii) a gasket orthogonally connected to a top portion of the cylindrical skirt, wherein the cylindrical skirt and the gasket of the non-permeable flexible grommet are formed as a single piece.

DETAILED DESCRIPTION OF THE INVENTION

The details of embodiments of the present disclosure, both as to their structure and operation, may be gleaned in part by study of the accompanying drawings, in which like reference numerals refer to like parts, and in which.

DETAILED DESCRIPTION OF THE INVENTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

Figure 1:
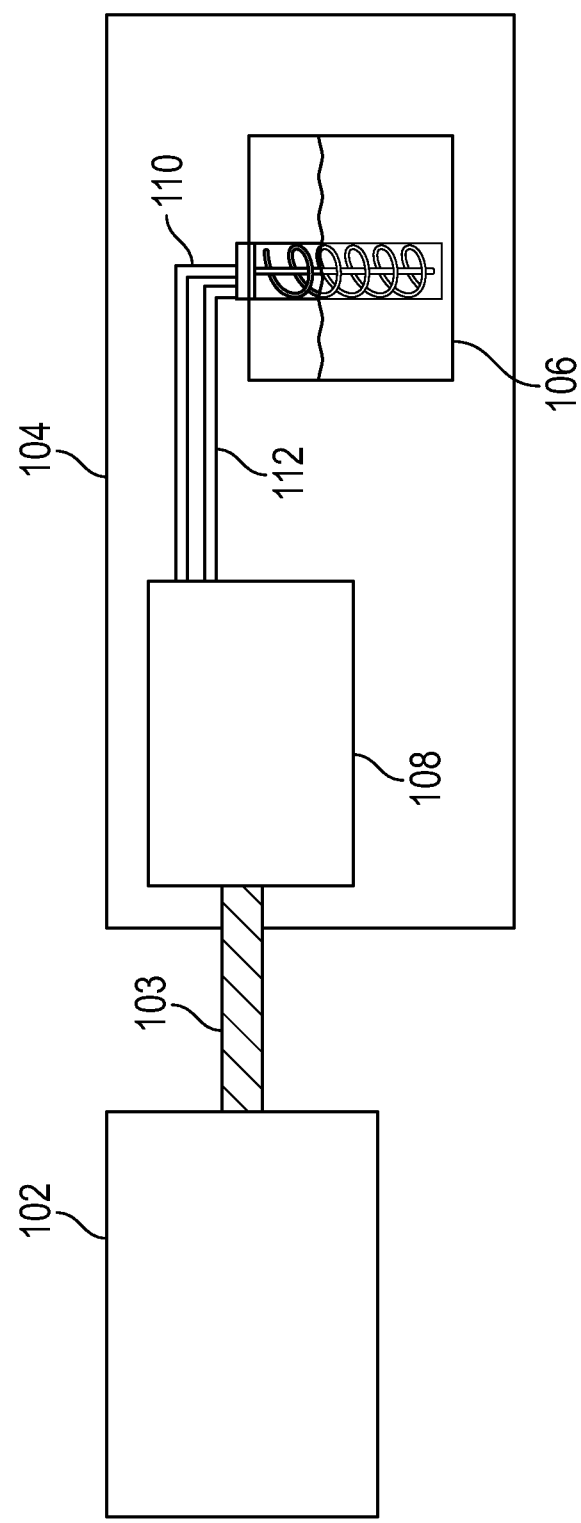
FIG. 1 show a schematic of an engine aftertreatment system according to an exemplary embodiment.

FIG. 1 shows a schematic of an engine 102 connected to an exhaust aftertreatment system 104 via a pipe 103 that delivers emission gases to the aftertreatment system 104. The aftertreatment system 104 includes a DEF tank 106 and a selective catalytic reduction (SCR) system/device 108. The DEF tank 106 is connected to the SCR system 108 via first and second pipes 110/112. The first pipe 110 delivers DEF from the tank 106 to the SCR system 108 and the second pipe 112 returns unused clean DEF back to the tank 106.

Figure 2:
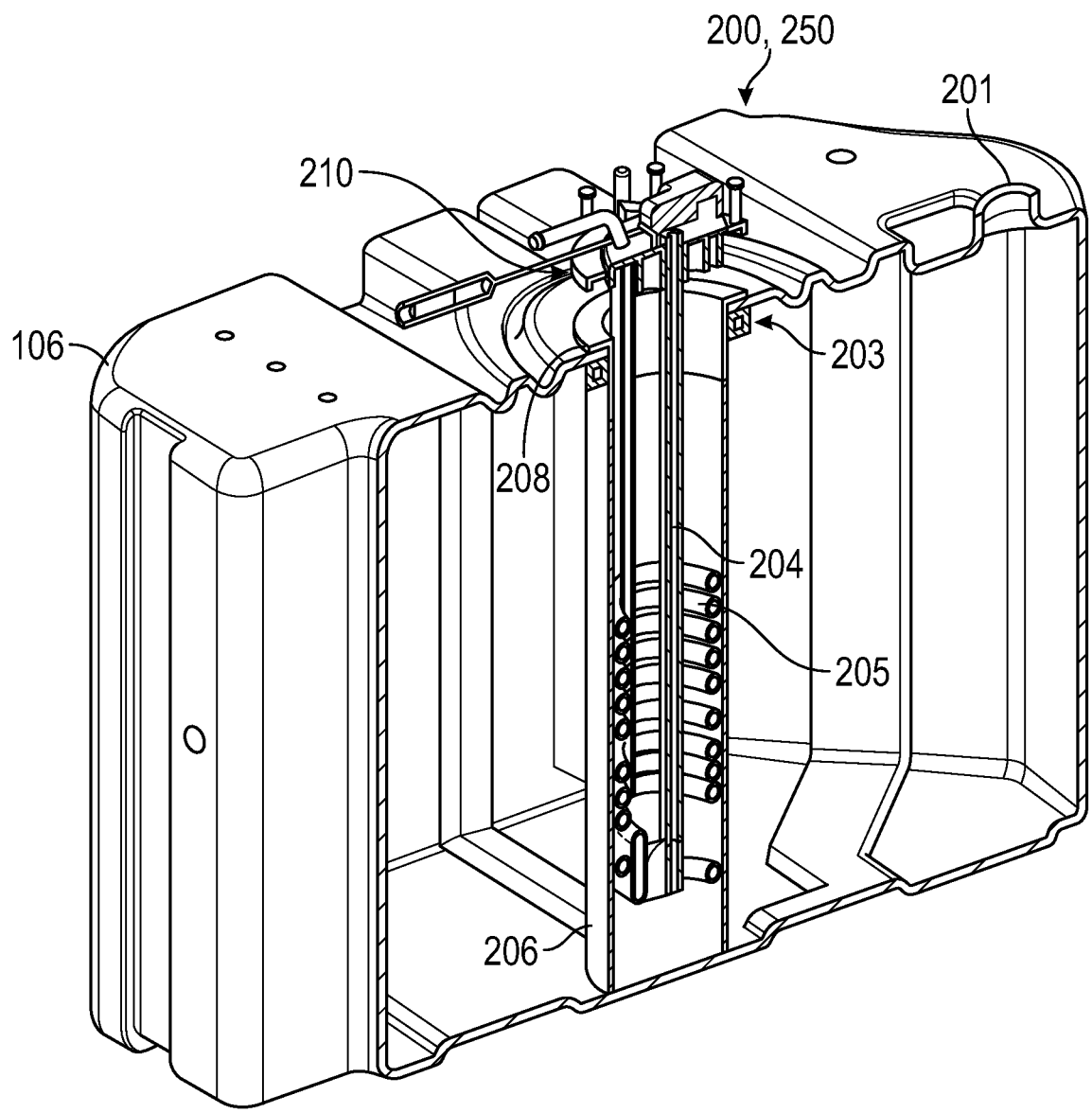
FIG. 2 shows a cut away view of a DEF tank that may be used in the engine aftertreatment system of FIG. 1.

FIG. 2 shows a DEF tank 106 including a DEF thawing coil/DEF manifold 200 and an integrated grommet and filter system 250. The tank 106 includes a refill opening 201 for filling the tank 106 with DEF. The refill opening 201 may be closed by a cap/stopper (not shown). The tank 106 also includes a main opening 203 for inserting the thawing coil/DEF manifold 200, which houses several electronic components, and the grommet integrated system 250 into the tank 106.

Figure 3:
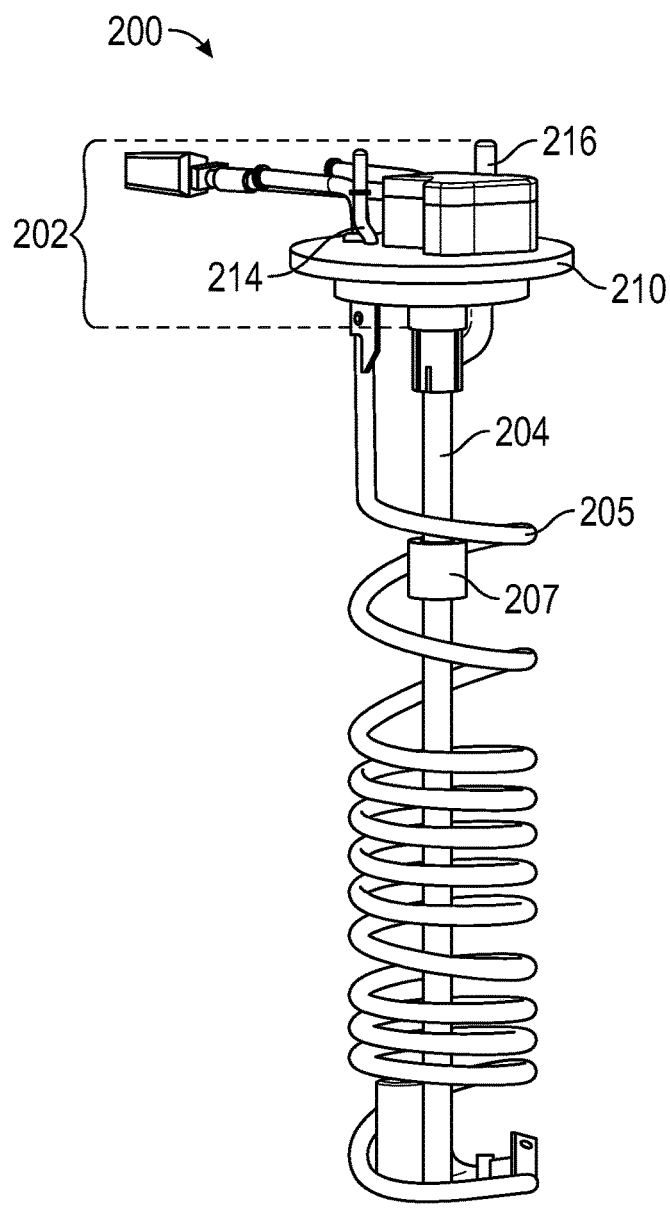
FIGS. 3 and 4 show a filter assembly which may be used in the DEF tank of FIG. 2.

FIG. 3 shows a perspective view of the thawing coil/DEF manifold 200. The DEF thawing coil/DEF manifold 200 includes a top/mounting portion 202, a heater coil 205, a supply tube 204, and a level sensor 207. The portions of the thawing coil/DEF manifold 200 inside the tank (e.g., coil 205, supply tube 204, and sensor 207) are surrounded by the integrated grommet filter 250.

Figure 4:
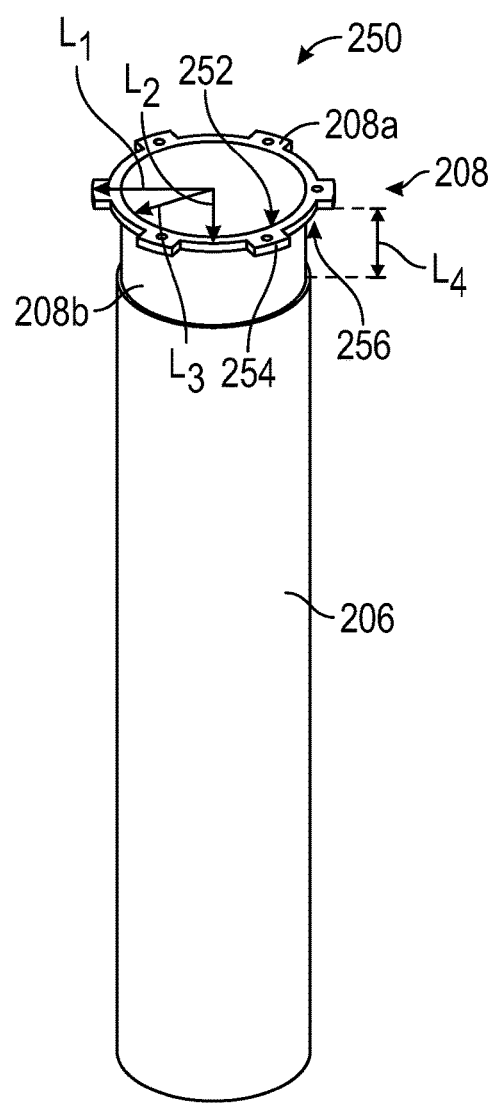

FIG. 4 shows a perspective view of the filtering system or integrated grommet filter 250, including a sock filter 206 and a skirt-style, flexible, non-permeable grommet 208. The inner portion of the integrated grommet filter 250 forms a clean DEF section of the tank 106. The grommet 208 is impermeable to debris and fluid while the filter 206 is porous such that DEF is allowed to pass through while, for example, dirt, debris, and ice particles, remain in the dirty (outside filter/grommet) part of the tank 106. In an exemplary embodiment, the filter 206 extends all the way to the bottom of the tank 106. The filter 206 is sized to fit around the heater/coil 205, which provides structural support to the filter 206 (see FIG. 2).

The flexible grommet 208 is a single solid piece and includes a top/gasket portion 208a and a bottom/skirt portion 208b that extends (e.g., by a length L4) from the gasket portion. In one embodiment, the gasket portion 208a includes an inner periphery/circumference 252, a first outer periphery/circumference 254, and a second outer periphery/circumference 256. The first outer periphery has a first outer diameter $L_1$, the second outer periphery has a second outer diameter $L_2$, and the inner periphery has an inner diameter $L_3$. The skirt 208b extends down from the inner circumference. The flexible grommet 208 is made of a DEF compatible material (e.g., a rubber/polymer-based material) that is non-permeable to fluid and compressible. The bottom portion 208b of the grommet 208 is integrally connected (e.g., via stitching, ultrasonic stitching, cloth welding, glue, staples etc.) to the sock filter 206. In an exemplary embodiment, the connection between the cylindrical skirt 208b and the sock filter 206 includes an overlap, such that a portion of the filter 206 overlaps and surrounds a portion of the grommet (or vice versa). The integral connection between the skirt 208b and the filter 206 eliminates the risk of debris over wash and protects the pump and injectors. Since the grommet 208 is integrally connected to the sock filter 206, the grommet 208 is necessarily removed and installed along with the filter 206. Thus, the presence of the top part 208a of the grommet 208 provides a visual indication/confirmation (e.g., to an operator servicing the DEF tank) that the filter 206 is inside the tank. This eliminates the need for an operator to open the tank 106 just to check for the presence of the filter 206. In addition, the integral connection of the grommet 208 to the filter 206 eliminates a need for a separate filter holder. Finally, the integrated grommet filter 208/206 may help an operator to visually confirm that the filter 206 is present inside the tank 106 (since the gasket 208a is embedded/integrally connected to the filter).

Figure 5:
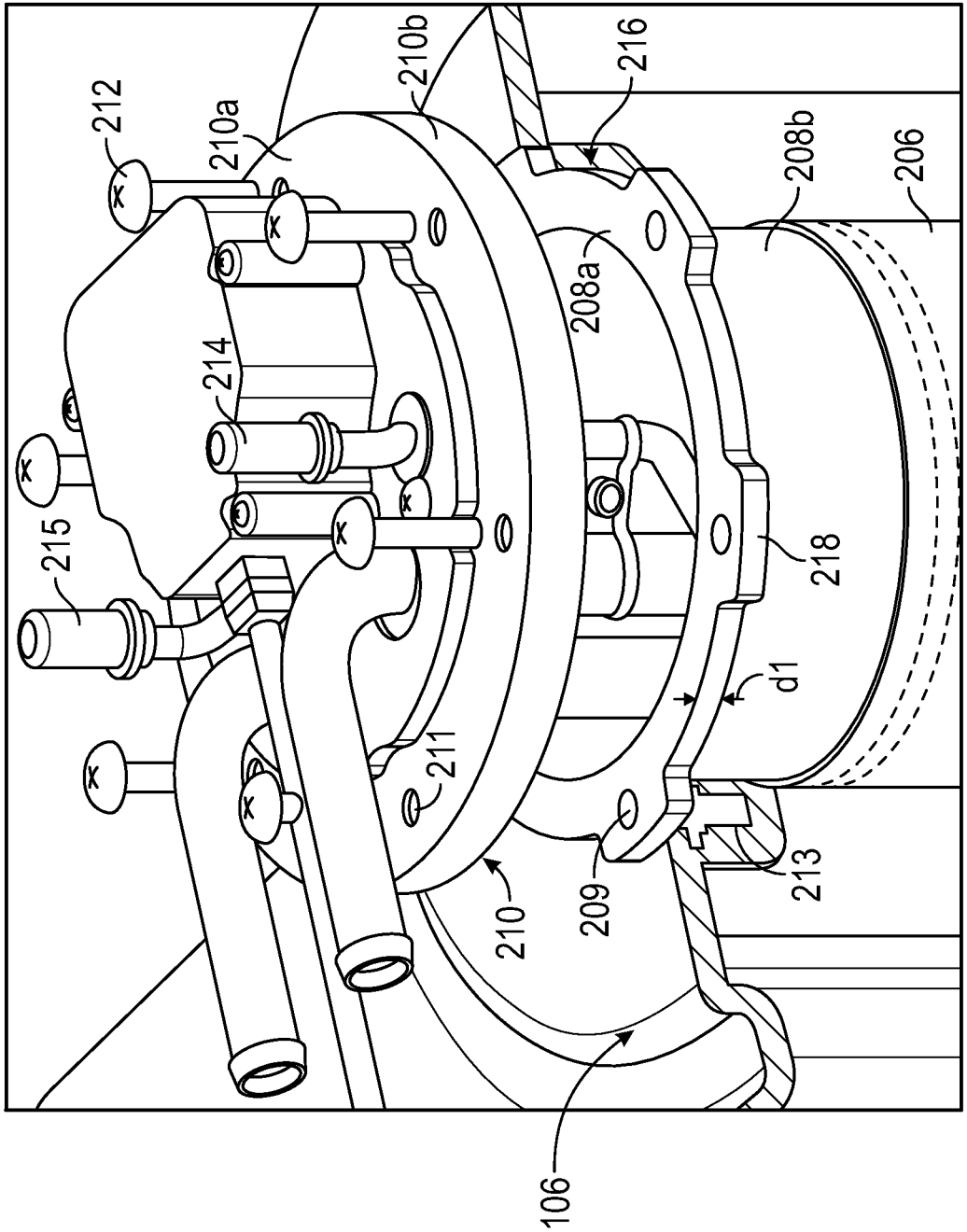
FIG. 5 shows a portion of the filter assembly of FIG. 3.
Figure 6:
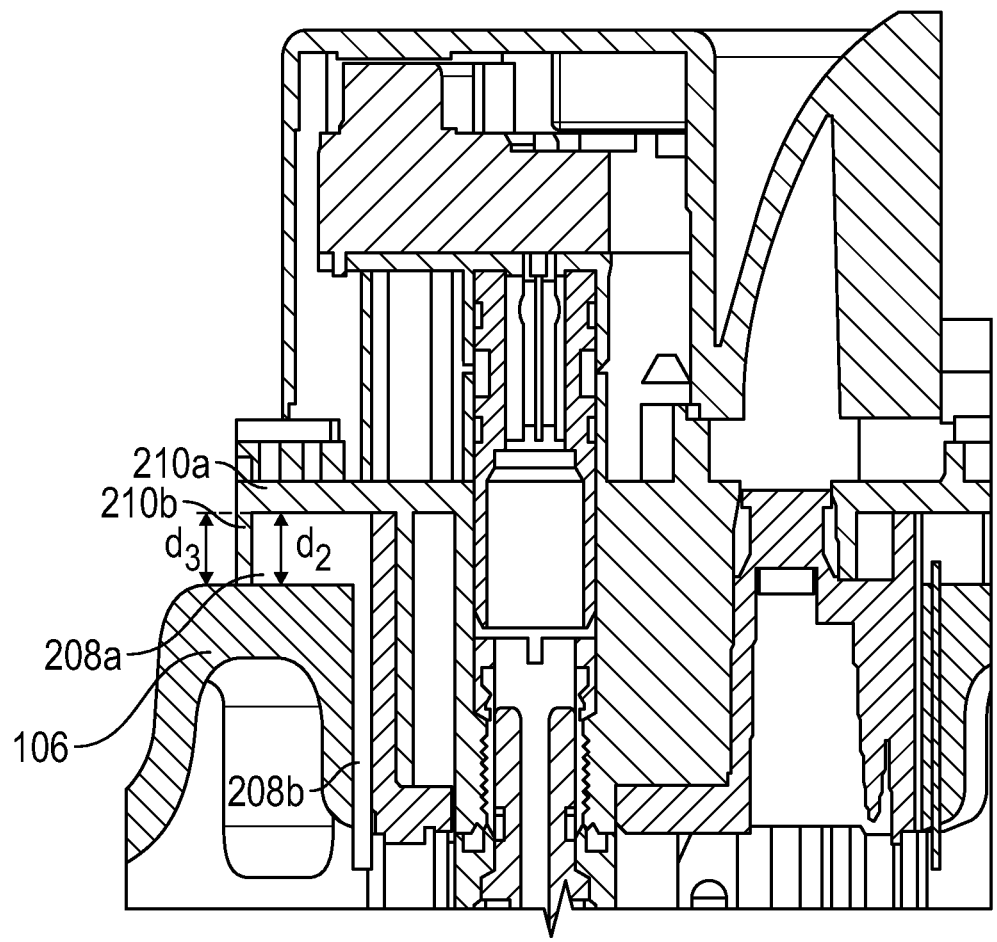
FIG. 6 shows a cross-section a portion of the filter assembly of FIG. 3.

FIG. 5 shows a part of the thawing coil/DEF manifold 200 and integrated grommet filter system 250 installed in the DEF tank 106. FIG. 6 shows a cross-section of a portion the thawing coil/DEF manifold and filtering system.

The thawing coil/DEF manifold 200 includes (i) a circular flange 210, (ii) a DEF return/inlet port 214 for returning unused clean DEF to the tank 106, (iii) a DEF outlet/supply port 215 for providing DEF to the aftertreatment system, (iv) coolant ports (not labeled), (v) the supply tube 204, (vi) the heater 205, and (v) the sensor 207.

The return port 214 includes a tube that extends through the flange 210 and connects to the second pipe 112 in FIG. 1. The tube of return port 214 ends in the clean section of the tank, inside the skirt 208b of the grommet 208 (as opposed to outside the clean section, or inside the clean section, but further down at the filter). Since the grommet 208 material is non-permeable, the returned clean fluid does not immediately pass through the filter 206 and back into the dirty side of the tank. Over time, this arrangement of the return port 214 and the skirt 208b decreases the load on, and extends the life of, the filter 206.

The outlet/supply port 215 includes a tube that extends through the flange 210 and is connected to the supply tube 204 and a pump (not labeled), which pumps clean DEF from the clean side of the DEF tank. In the aftertreatment system, the outlet port 215 is connected to the first pipe 112 in FIG. 1.

In an exemplary embodiment, the flange 210 includes a top portion 210a and a raised lip or projection portion 210b extending from the outside edge of the first portion. In an embodiment, the raised lip portion 210b is a continuous ring (with height $d_3$) that protrudes at a 90-degree angle from the outer edge of the bottom of the first portion (as shown in FIG. 6). In one embodiment, the lip portion 210b includes one or more openings (not shown) that would allow an operator to visually check for the presence of the grommet 208. The flange 210 includes openings for the return port 214, the supply port 215, and the two coolant ports. In addition, the flange 210 is solidly connected to the rest of the thawing coil/DEF manifold 200.

The grommet and filter system 250 is installed in the tank 106 via the gasket part 208a of the grommet 208. The gasket portion 208a is installed between the top wall of the tank 106 and the flange 210.

The gasket 208a includes first bolt openings 209 extending through the gasket 208a; the flange 210 includes second bolt openings 211 extending through the top portion 210a; and the top wall of the tank 106 includes bolt receptacles 213 around the main tank opening 203. The first bolt openings, the second bolt openings, and the bolt receptacles (i) are annularly spaced apart on their respective parts, (ii) match in number, (iii) align to each other when the thawing coil/DEF manifold is installed, (iv) match in diameter. The number of each of first bolt openings 209, the second bolt openings 211, and the receptacles 213, may be six (as shown in FIG. 5), however, the disclosure is not limited to a particular number of openings.

Bolts/fasteners 212 are installed through the first and second openings 209/211, and inserted into the bolt receptacles 213 by an operator. In an exemplary embodiment, the assembly includes six bolts (FIG. 5), however, the disclosure is not limited to a particular number of bolts, as long as the number matches the number of each of the first openings 209, the second openings 211, and the bolt receptacles 213.

In an exemplary embodiment, while the bolts 212 are being inserted and tightened by the operator, the gasket 208a is vertically compressed between the top wall of the tank and the flange 210. Thus, the gasket 208a has an initial uncompressed thickness $d_1$ (FIG. 5) and a final, smaller thickness $d_2$ (FIG. 6). In one embodiment, the gasket 208a is compressed by the flange 210 from an initial thickness $d_1$ of 6.5 mm to a final thickness $d_2$ of 5 mm.

The tab/lip portion 210b of the flange 210 acts as a vertical compression limiter for the gasket 208a, so that an operator is physically prevented from over-compressing the gasket 208a during installation (e.g., by over-tightening the bolts 212). The final thickness $d_2$ of the gasket 208a is equal to the height $d_3$ of the lip 210b of the flange 210. The flange 210 may be a hard material (e.g., hard plastic or metal), so the connection between the lip 210b and the tank 106 is a hard joint. In addition, within the assembly, the gasket 208a needs to horizontally fit inside the lip portion 210b, so the outermost parts of the gasket 208a cannot extend beyond the inside of the lip 210b.

The gasket 208a includes cut-out or relief portions/spaces 216 between protruding portions 218. In one embodiment, number of protruding portions (e.g., six as shown in FIG. 5) is equal to the number of openings 209 in the gasket 208a and each of the protruding portions includes one centrally located (with respect to the protruding portion) bolt opening 209. In another embodiment, the number of protruding portions 218 may be greater than the number of openings, such that some of the protruding portions 218 do not include a bolt opening 209. In another embodiment, the number of protruding portions 218 may be smaller than number of bolt openings 209 if, for example, two neighboring protrusions 218 of FIG. 5 are combined into one.

In an exemplary embodiment, the protrusions 218 are identical in shape and size to one another and are equally annularly spaced apart from one another. In alternate embodiments, some of the protrusions may have different shapes and/or sizes from others. For example, the protrusions 218 may alternate in size/shape.

In an exemplary embodiment, the cut-out portions 216 are equally annularly spaced apart and open to the outside of the gasket 208a. However, in alternate embodiments, some or all cut out portions 216 may be surrounded by gasket 208a material. For example, a solid circular gasket without protrusions and with additional holes as cut-out portions 216 may be used.

In one example, as shown in FIG. 5, the gasket 208a may be star shaped with rectangular protruding portions 218 having round corners. However, the protrusions 218 may be formed having other shapes, for example, trapezoids, semi-circles, etc. During installation, as the gasket 208a is compressed vertically, it needs space to expand horizontally. Since the gasket 208a is prevented in expanding outwardly/horizontally beyond the lip portion 210b of the flange 210, the empty cut-out portions 216 give the gasket 208a space to expand into the cut-out portions 216 as needed. This design may prevent counterfeit circular gaskets from being used with the assembly because a normal circular gasket (with no cut-outs) would not leave room for the gasket to expand horizontally past the lip 210b during installation, leading to overfill and poor joint integrity.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of engine or aftertreatment system. Hence, although the present embodiments are, for convenience of explanation, depicted and described as being implemented in a specific aftertreatment system, it will be appreciated that it can be implemented in any engine aftertreatment system that requires injection of DEF. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A diesel exhaust fluid (DEF) injection and filtration assembly for use in a DEF tank of an engine aftertreatment system, the DEF injection and filtration assembly comprising:
a DEF injection device with a flange, the flange having a lip portion extending therefrom; and
an integrated grommet filter comprising a grommet integrally connected to a sock filter, the grommet having a gasket portion and a skirt portion;
wherein the gasket portion includes a plurality of cut-out portions annularly spaced apart from one another around a center axis; and
wherein the gasket portion forms an outer periphery and an inner periphery, and the plurality of cut-out portions extend radially between the outer periphery and the inner periphery.

2. The assembly of claim 1, wherein the grommet is one solid piece.

3. The assembly of claim 1, wherein the grommet is made from a material that is non-permeable to the DEF.

4. The assembly of claim 1, wherein the skirt portion includes a partial overlap with the sock filter.

5. The assembly of claim 4, wherein the grommet is integrally connected to the sock filter via stitching provided on the partial overlap.

6. The assembly of claim 1, wherein the gasket portion includes a circular portion and a plurality of protrusions protruding outward from the circular portion and in an alternating arrangement with the plurality of cut-out portions.

7. The assembly of claim 6, wherein each of the plurality of protrusions includes a bolt hole.

8. The assembly of claim 6, wherein the plurality of protrusions are annularly spaced apart from one another around a perimeter of the circular portion.

9. The assembly of claim 1, wherein the lip portion protrudes down from an outer circumference of the circular portion.

10. The assembly of claim 1, wherein the lip portion is positioned around the gasket portion.

11. The assembly of claim 1, wherein a height of the lip portion is equal to a height of the gasket.

12. The assembly of claim 1, wherein the DEF injection device includes a DEF return tube extending through the flange, wherein an end portion of the DEF return tube is positioned inside the skirt portion of the grommet.

13. A fluid injection and filter assembly for use in a diesel exhaust fluid (DEF) tank, the fluid injection and filter assembly comprising:
a skirt-style grommet including an annular gasket portion and a cylindrical skirt portion;
the annular gasket portion including a plurality of cut-out portions annularly spaced around a center axis defined by the cylindrical skirt portion;
a sock filter integrally connected to the cylindrical skirt portion; and
a circular flange including a top portion and a lip portion protruding from an outer circumference of the top portion.

14. The fluid injection and filter assembly of claim 13, further comprising a coil heater element connected to the circular flange, wherein the sock filter is configured to fit around the coil heater element.

15. The fluid injection and filter assembly of claim 13, wherein the lip portion of the flange has a ring shape, and wherein an outer circumference of the annular gasket portion of the skirt-style grommet is smaller than an inner circumference of the lip portion, such that the annular gasket is configured to fit inside the lip portion.

16. The fluid injection and filter assembly of claim 15, wherein the annular gasket has a first height corresponding to an uncompressed state of the annular gasket, wherein the lip portion of the flange has a second height, and wherein the first height is greater than the second height.

17. An integrated grommet filter for use in a diesel exhaust fluid (DEF) tank of an engine aftertreatment system, the integrated grommet filter comprising:
   a sock filter;
   a non-permeable flexible grommet having (i) a cylindrical skirt defining a center axis and having a bottom portion overlapping and integrally connected to the sock filter and (ii) a gasket orthogonally connected to a top portion of the cylindrical skirt, and the gasket including a plurality of protrusions extending radially outward, and a plurality of bolt holes formed in the plurality of protrusions;
   wherein the cylindrical skirt and the gasket of the non-permeable flexible grommet are formed as a single piece.

18. The integrated grommet filter of claim 17, wherein the gasket includes one or more cut-out portions.

19. The integrated grommet filter of claim 18, wherein the cut-out portions are equally annularly spaced apart at an outer perimeter of the gasket.

\* \* \* \* \*